United States Patent
Dong et al.

(10) Patent No.: US 8,515,763 B2
(45) Date of Patent: Aug. 20, 2013

(54) METHODS AND SYSTEMS FOR UTILIZING VOICE COMMANDS ONBOARD AN AIRCRAFT

(75) Inventors: Xian Qin Dong, Beijing (CN); Xiao Long Qin, Beijing (CN)

(73) Assignee: Honeywell International Inc., Morristown, NJ (US)

( * ) Notice: Subject to any disclaimer, the term of this patent is extended or adjusted under 35 U.S.C. 154(b) by 1081 days.

(21) Appl. No.: 12/625,186

(22) Filed: Nov. 24, 2009

(65) Prior Publication Data

US 2011/0125503 A1    May 26, 2011

(51) Int. Cl.
*G10L 21/02* (2006.01)

(52) U.S. Cl.
USPC .......................................... 704/275; 701/14

(58) Field of Classification Search
USPC .................... 704/226, 233, 275; 701/14
See application file for complete search history.

(56) References Cited

U.S. PATENT DOCUMENTS

| | | | |
|---|---|---|---|
| 4,725,956 A | 2/1988 | Jenkins | |
| 5,844,503 A | 12/1998 | Riley et al. | |
| 6,128,594 A | 10/2000 | Gulli et al. | |
| 6,182,039 B1 | 1/2001 | Rigazio et al. | |
| 6,346,892 B1 | 2/2002 | DeMers et al. | |
| 6,360,203 B1 * | 3/2002 | Prince | 704/270 |
| 6,691,004 B2 * | 2/2004 | Johnson et al. | 701/14 |
| 6,697,716 B2 | 2/2004 | Horst | |
| 6,859,773 B2 | 2/2005 | Breton | |
| 6,985,852 B2 | 1/2006 | Wang | |
| 7,089,108 B2 | 8/2006 | Merritt | |
| 7,174,300 B2 | 2/2007 | Bush | |
| 7,289,890 B2 | 10/2007 | Mitchell et al. | |
| 7,415,326 B2 | 8/2008 | Komer et al. | |
| 7,496,511 B2 | 2/2009 | Vora | |
| 7,555,431 B2 | 6/2009 | Bennett | |
| 7,580,377 B2 | 8/2009 | Judd | |
| 7,606,715 B1 | 10/2009 | Krenz | |
| 7,672,850 B2 * | 3/2010 | Kaatrasalo | 704/270.1 |
| 8,195,347 B2 * | 6/2012 | Boorman | 701/16 |
| 8,224,653 B2 * | 7/2012 | De Mers et al. | 704/275 |
| 2002/0087319 A1 | 7/2002 | Stephenson | |
| 2002/0107694 A1 | 8/2002 | Lerg | |
| 2003/0025682 A1 | 2/2003 | Dame | |
| 2004/0030560 A1 * | 2/2004 | Takami et al. | 704/275 |
| 2004/0124998 A1 | 7/2004 | Dame | |
| 2004/0138882 A1 | 7/2004 | Miyazawa | |
| 2005/0114140 A1 | 5/2005 | Brackett et al. | |
| 2005/0203700 A1 | 9/2005 | Merritt | |
| 2005/0228674 A1 | 10/2005 | Gunn et al. | |
| 2007/0288128 A1 | 12/2007 | Komer et al. | |

OTHER PUBLICATIONS

EP Communication, EP 10 187 078.0-2225 dated Jul. 17, 2012.
Demers, Method and System for Operating a Vehicular Electronic System with Voice Command Capability, filed with the U.S. Patent Office on Dec. 19, 2008 and assigned U.S. Appl. No. 12/340,065.
EP Search Report, EP 10187078.0-2225 dated Mar. 15, 2011.

* cited by examiner

*Primary Examiner* — Abul Azad
(74) *Attorney, Agent, or Firm* — Ingrassia Fisher & Lorenz, P.C.

(57) ABSTRACT

Methods and systems are provided for utilizing audio commands onboard an aircraft. A method comprises identifying a flight phase for the aircraft, resulting in an identified flight phase, receiving an audio input, resulting in received audio input, filtering the received audio input in a manner that is influenced by the identified flight phase for the aircraft, resulting in filtered audio input, and validating the filtered audio input as a first voice command of a first plurality of possible voice commands.

15 Claims, 2 Drawing Sheets

FIG. 2

METHODS AND SYSTEMS FOR UTILIZING VOICE COMMANDS ONBOARD AN AIRCRAFT

TECHNICAL FIELD

The subject matter described herein relates generally to avionics, and more particularly, embodiments of the subject matter relate to systems adapted for utilizing speech recognition and voice commands onboard an aircraft.

BACKGROUND

Modern aircraft include numerous avionics systems and other electronic components or modules. For example, an individual aircraft may include a navigation system, a communication system, a flight management system, an autopilot system, an autothrust system, an electronic flight bag, and a display system. Historically, in some implementations, each system has its own set of user input devices, such as buttons, switches, keys, knobs, sliders, joysticks, and the like, for receiving input from a pilot, co-pilot, or crew. As a result, there may be a considerable number of user input devices within the cockpit of the aircraft. Additionally, each avionics system may be associated with its own display.

To simplify the process of obtaining information from avionics systems, modern aircraft systems consolidate the displays from individual avionics systems to a few central display devices. In addition, to reduce the number of user input devices within the cockpit, some prior art systems also consolidate the functionality of the user input devices for the various avionics systems to a reduced set of input devices, for example, by consolidating functionality of similar input devices across the various avionics systems with an individual input device. This may provide a more consistent user interface and reduce aircraft weight, however, the amount of information and/or functionality associated with a particular display and/or input device increases the complexity of operation. During operation of the aircraft, it is desirable that a pilot (or co-pilot or another crew member) be able to quickly and conveniently interact with the avionics systems to operate the avionics systems and/or obtain information needed to ensure safe operation of the aircraft. Some prior art systems attempt to implement speech recognition systems to enable a pilot to quickly and reliably interact with the various avionics systems and cockpit components. However, these systems fail to account for various aspects of the aircraft operation, such as the operating environment, heightened reliability and accuracy requirements, time-sensitive nature of some aircraft operations, and other safety concerns.

BRIEF SUMMARY

A method is provided for utilizing audio commands onboard an aircraft. The method comprises identifying a flight phase for the aircraft, resulting in an identified flight phase, receiving an audio input, resulting in received audio input, filtering the received audio input in a manner that is influenced by the identified flight phase for the aircraft, resulting in filtered audio input, and validating the filtered audio input as a first voice command of a first plurality of possible voice commands.

In another embodiment, a system is provided for an aircraft. The system comprises an avionics system onboard the aircraft, an audio input device onboard the aircraft capable of receiving audio input, a data storage element comprising a first plurality of possible voice commands, and a processing system coupled to the avionics system, the audio input device, and the data storage element. The processing system is configured to identify a flight phase for the aircraft, resulting in an identified flight phase, filter the audio input based on the identified flight phase, resulting in filtered audio input, recognize the filtered audio input as a first voice command of the first plurality of possible voice commands, and provide the first voice command to the avionics system in response to recognizing the filtered audio input as the first voice command, wherein the avionics system is configured to execute the first voice command.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

Embodiments of the subject matter will hereinafter be described in conjunction with the following drawing figures, wherein like numerals denote like elements.

DETAILED DESCRIPTION

The following detailed description is merely exemplary in nature and is not intended to limit the subject matter of the application and uses thereof. Furthermore, there is no intention to be bound by any theory presented in the preceding background, brief summary, or the following detailed description.

Techniques and technologies may be described herein in terms of functional and/or logical block components, and with reference to symbolic representations of operations, processing tasks, and functions that may be performed by various computing components or devices. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The following description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter. In addition, certain terminology may also be used in the following description for the purpose of reference only, and thus are not intended to be limiting. For example, terms such as "first", "second" and other such numerical terms do not imply a sequence or order unless clearly indicated by the context.

For the sake of brevity, conventional techniques related to speech and/or voice recognition, audio-to-digital conversion, digital-to-audio conversion, aircraft controls, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Technologies and concepts discussed herein relate to systems adapted for receiving, recognizing, validating, and executing voice commands received from a user (e.g., a pilot) operating a vehicle (e.g., an aircraft). An audio input device, such as a microphone, is located onboard the vehicle (e.g., within the cockpit of an aircraft) and adapted to receive audio input indicative of a desired voice command. The received audio input is filtered based on the operating state and/or flight phase of the vehicle, and one or more speech recognition techniques and/or algorithms are preformed to recognized and/or match the filtered audio input as a particular voice command using a limited set of voice commands. As described in greater detail below, filtering the audio input based on the operating state and/or flight phase and using a limited vocabulary of known commands improves the accuracy and response time of the speech recognition. When audio input is recognized and/or matched to a voice command within the limited set of voice commands, the selected and/or identified voice command is validated based on one or more criterion associated with the voice command before the voice command is provided to the appropriate avionics system for execution. Although the subject matter is described herein in the context of an aircraft, it should be understood that the subject matter may be similarly utilized in other vehicles (e.g., automobiles, marine vessels, trains), and the subject matter described herein is not intended to be limited to an aviation environment.

Figure 1:
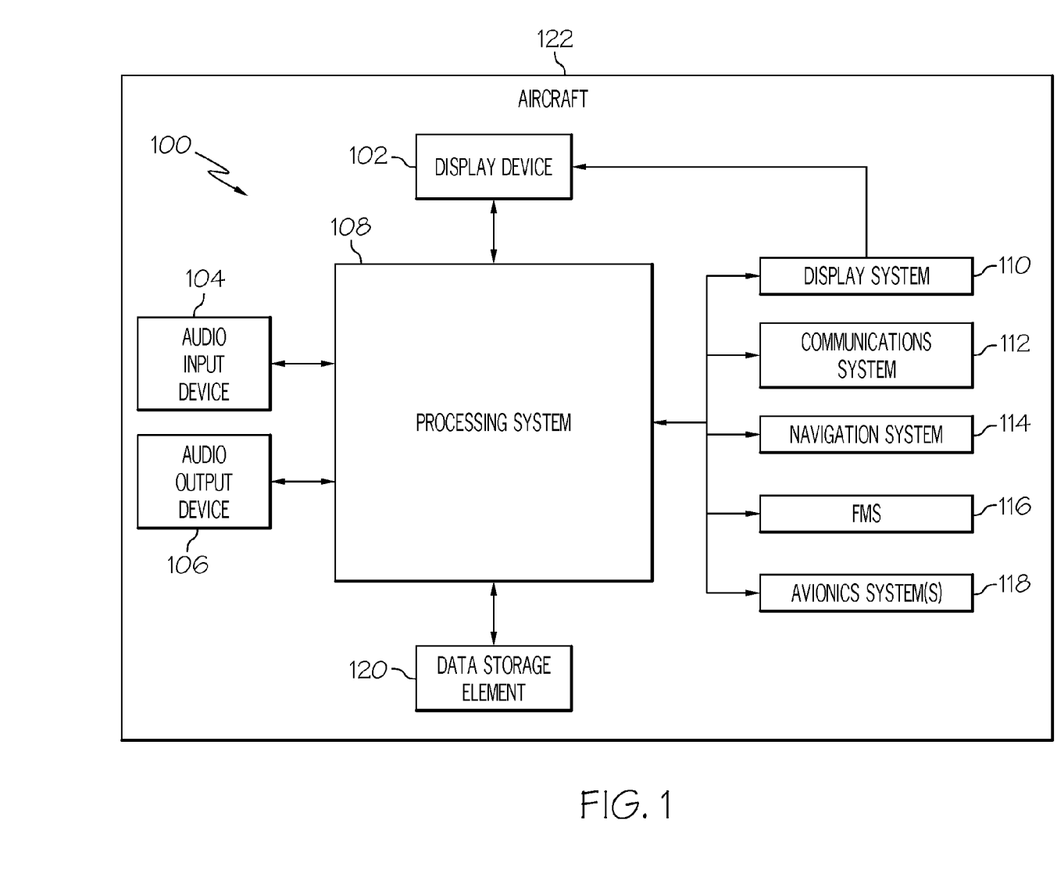
FIG. 1 is a block diagram of a system suitable for use in an aircraft in accordance with one embodiment.

FIG. 1 depicts an exemplary embodiment of a system 100, which may be located onboard a vehicle such as an aircraft 122. In an exemplary embodiment, the system 100 includes, without limitation, a display device 102, an audio input device 104, an audio output device 106, a processing system 108, a display system 110, a communications system 112, a navigation system 114, a flight management system (FMS) 116, one or more avionics systems 118, and a data storage element 120 suitably configured to support operation of the system 100, as described in greater detail below. It should be understood that FIG. 1 is a simplified representation of a system 100 for purposes of explanation and ease of description, and FIG. 1 is not intended to limit the application or scope of the subject matter in any way. Practical embodiments of the system 100 and/or aircraft 122 will include numerous other devices and components for providing additional functions and features, as will be appreciated in the art. In this regard, although FIG. 1 depicts a single avionics system 118, in practice, the system 100 and/or aircraft 122 will likely include numerous avionics systems for obtaining and/or providing real-time flight-related information that may be displayed on the display device 102 or otherwise provided to a user (e.g., a pilot, a co-pilot, or crew member) via the audio output device 106. A practical embodiment of the system 100 and/or aircraft 122 will likely include one or more of the following avionics systems suitably configured to support operation of the aircraft 122: a weather system, an air traffic management system, a radar system, a traffic avoidance system, an enhanced ground proximity warning system, an autopilot system, an autothrust system, a flight control system, an electronic flight bag and/or another suitable avionics system.

In an exemplary embodiment, the display device 102 is coupled to the display system 110. The display system 110 is coupled to the processing system 108, and the processing system 108 and the display system 110 are cooperatively configured to display, render, or otherwise convey one or more graphical representations or images associated with operation of the aircraft 122 on the display device 102, as described in greater detail below. The processing system 108 is coupled to the navigation system 114 for obtaining real-time navigational data and/or information regarding operation of the aircraft 122 to support operation of the system 100. In an exemplary embodiment, the communications system 112 is coupled to the processing system 108 and configured to support communications to and/or from the aircraft 122, as will be appreciated in the art. The processing system 108 is also coupled to the flight management system 116, which in turn, may also be coupled to the navigation system 114, the communications system 112, and one or more additional avionics systems 118 to support navigation, flight planning, and other aircraft control functions in a conventional manner, as well as to provide real-time data and/or information regarding operation of the aircraft 122 to the processing system 108. In an exemplary embodiment, the audio input device 104 is coupled to the processing system 108, and the audio input device 104 and the processing system 108 are cooperatively configured to allow a user to interact with the display device 102 and other elements of system 100 by providing an audio input to the audio input device 104, as described in greater detail below. The audio output device 106 is coupled to the processing system 108, and the audio output device 106 and the processing system 108 are cooperatively configured to provide auditory feedback to a user, as described in greater detail below.

In an exemplary embodiment, the display device 102 is realized as an electronic display configured to graphically display flight information or other data associated with operation of the aircraft 122 (e.g., data from one or more avionics systems 112, 114, 116, 118) under control of the display system 110 and/or processing system 108. In an exemplary embodiment, the display device 102 is onboard the aircraft 122 and located within the cockpit of the aircraft 122. It will be appreciated that although FIG. 1 shows a single display device 102, in practice, additional display devices may be present onboard the aircraft 122. In an exemplary embodiment, the audio input device 104 and audio output device 106 are also located within the cockpit of the aircraft 122 and adapted to allow a user (e.g., pilot, co-pilot, or crew member) to provide audio input to and receive auditory output from the system 100 and enables a user to interact with the elements of the system 100 in a "hands free" and/or "head up" manner without requiring a user to move his or her hands and/or head to provide and/or receive information, as described in greater detail below. In various embodiments, the audio input device 104 may be realized as a microphone, audio transducer, audio sensor, or another suitable device adapted to receive or otherwise sense audio input from a user. In some embodiments, the audio input device 104 may also include an activation element that comprises a physical feature, such as a button or switch, which may be utilized to enable or otherwise activate the audio input device 104 (e.g., push-to-talk), as will be appreciated in the art and described in greater detail below. In various embodiments, the audio output device 106 may be realized as a speaker, headphone, earphone, earbud, or another suitable device adapted to provide auditory output to a user. In this regard, in some embodiments, the audio input device 104 and audio output device 106 may be integrated on a single headset, as will be appreciated in the art. It should be appreciated that although FIG. 1 shows the display device 102, the audio input device 104, and the audio output device 106 as being located within the aircraft 122, in practice, one or more of the display device 102, the audio input device 104, and the audio output device 106 may be located outside the aircraft 122 (e.g., on the ground as part of an air traffic control center or another command center) and communicatively coupled to the remaining elements of the system 100 (e.g., via a data link).

In an exemplary embodiment, the navigation system 114 is configured to obtain one or more navigational parameters associated with operation of the aircraft 122. The navigation system 114 may be realized as a global positioning system (GPS), inertial reference system (IRS), or a radio-based navigation system (e.g., VHF omni-directional radio range (VOR) or long range aid to navigation (LORAN)), and may include one or more navigational radios or other sensors suitably configured to support operation of the navigation system 114, as will be appreciated in the art. In an exemplary embodiment, the communications system 112 is suitably configured to support communications between the aircraft 122 and another aircraft or ground location (e.g., air traffic control). In this regard, the communications system 112 may be realized using a radio communication system or another suitable data link system. In an exemplary embodiment, the flight management system 116 maintains information pertaining to a current flight plan (or alternatively, a current route or travel plan).

In accordance with one or more embodiments, the flight management system 116 (or another avionics system 118) is configured to determine, track, or otherwise identify the current operating state (e.g., flight phase or phase of flight) of the aircraft 122, as described in greater detail below. As used herein, a flight phase or phase of flight of the aircraft 122 should be understood as a distinguishable segment of the operation (or distinguishable operating phase) of the aircraft 122 associated with traversing the aircraft 122 from a starting location to an ending location. For example, operation of the aircraft 122 from a starting location (e.g., a terminal at a first airport) to an ending location (e.g., a terminal at a second airport) usually comprises a plurality of flight phases, such as, for example, a standing phase (e.g., when the aircraft is stationary on the ground), a pushback or towing phase (e.g., when the aircraft is moving on the ground with assistance), a taxiing phase, a takeoff phase, a climbing phase (e.g., including the initial climb and/or climb to cruise), a cruising phase, a descent phase (e.g., from cruise altitude to initial approach), an approach phase, a landing phase, and the like. Various phases of flight are well known, and will not be described in detail herein. It should be noted that the phases of flight may be combined and/or categorized in numerous possible manners and/or each phase of flight may comprise numerous sub-phases (for example, an approach phase may include sub-phases for holding, procedure turn, flyover, orbit, and the like), and the subject matter is not intended to be limited to any particular number and/or classification of flight phases. In addition to delineated flight phases, the flight management system 116 may identify other operating states of the aircraft 122, such as, for example, operation with one or more engines disabled, operation when afterburners onboard the aircraft 122 are being utilized, transonic and/or supersonic operation of the aircraft 122, and the like.

The display system 110 generally represents the hardware, software, and/or firmware components configured to control the display and/or rendering of one or more navigational maps and/or other displays pertaining to operation of the aircraft 122 and/or avionics systems 112, 114, 116, 118 on the display device 102. In this regard, the display system 110 may access or include one or more databases suitably configured to support operations of the display system 110, such as, for example, a terrain database, an obstacle database, a navigational database, a geopolitical database, a terminal airspace database, a special use airspace database, or other information for rendering and/or displaying content on the display device 102.

The processing system 108 generally represents the hardware, software, and/or firmware components configured to facilitate communications and/or interaction between the audio devices 104, 106 and the other elements of the system 100 and perform additional tasks and/or functions described in greater detail below. Depending on the embodiment, the processing system 108 may be implemented or realized with a general purpose processor, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. The processing system 108 may also be implemented as a combination of computing devices, e.g., a plurality of processing cores, a combination of a digital signal processor and a microprocessor, a plurality of microprocessors, one or more microprocessors in conjunction with a digital signal processor core, or any other such configuration. In practice, the processing system 108 includes processing logic that may be configured to carry out the functions, techniques, and processing tasks associated with the operation of the system 100, as described in greater detail below. Furthermore, the steps of a method or algorithm described in connection with the embodiments disclosed herein may be embodied directly in hardware, in firmware, in a software module executed by the processing system 108, or in any practical combination thereof. In an exemplary embodiment, the processing system 108 implements a speech recognition engine (or voice recognition engine) and/or speech-to-text system as well as a speech synthesizer and/or text-to-speech system. The processing system 108 may also include one or more analog-to-digital converters (ADCs), digital-to-analog converters (DACs), analog filters and/or digital filters suitably configured to support operations of the system 100, as described in greater detail below. In some embodiments, the features and/or functionality of the processing system 108 may be implemented as part of the flight management system 116 or another avionics system 118, as will be appreciated in the art.

In an exemplary embodiment, the data storage element 120 maintains a plurality of possible voice commands for the system 100, wherein a voice command may be selected or otherwise indicated by a user via the audio input device 104, as described in greater detail below. In an exemplary embodiment, the plurality of possible voice commands comprises a limited set of voice commands that are arranged in a cascaded or hierarchical manner, such that each voice command of the plurality of possible voice commands starts with one of about ten to twenty possible initial command words. For example, in accordance with one embodiment, each voice command of the plurality of possible voice commands starts with one of the following initial command words: "DISPLAY," "SET," "RESET," "OPEN," "CLOSE," "START," "STOP," "READ," "TUNE," "TEST," "INHIBIT," and "CLEAR." In this regard, the data storage element 120 may maintain the plurality of possible voice commands in a tree data structure, wherein the root node has a limited number of child nodes corresponding to the initial command words. The limited number of initial command words provided by the limited set of voice commands improves the accuracy and response time of the speech recognition, as described in greater detail below. In accordance with one or more embodiments, subsequent layers of the voice command hierarchy are also limited in the number of words (or parameters) which may follow the initial and/or preceding command word. For example, in accordance with one embodiment, each initial command word may be followed by less than twelve subsequent command words (or parameters), or in other words, each child node of the root node has a limited number (e.g., twelve or fewer) of child nodes. In some embodiments, the subsequent command words may have a similarly limited number of words (or parameters) that may follow them (e.g., a child node of a child node of the root node has a limited number of child nodes), and so on, as will be appreciated in the art. In an exemplary embodiment, the data storage element 120 also maintains a control voice command or activation voice command that comprises one or more words that may be utilized to enable or otherwise activate a voice command recognition process, as described in greater detail below.

In an exemplary embodiment, for each voice command of the plurality of possible voice commands, the data storage element 120 maintains an association between the respective voice command and one or more criteria or rules, which restrict operation and/or execution of the respective voice command. In an exemplary embodiment, each voice command is associated with a flight phase criterion which prescribes limits and/or restricts the phase(s) of flight (or flight phase(s)) and/or operating states during which the voice command may be executed, as described in greater detail below. In addition, a respective voice command may be associated with safety level that requires a particular validation process. In some embodiments, if the voice command includes a parameter, the voice command may be associated with a criterion which prescribes or otherwise limits the range of acceptable input values for the parameter, as described in greater detail below.

In an exemplary embodiment, the data storage element 120 also maintains one or more acoustic noise models, wherein each acoustic noise model corresponds to the auditory (or audible) ambient noise (or background noise) proximate to the audio input device 104 during a respective operating state and/or flight phase for the aircraft 122, that is, the ambient noise and/or background noise which would be received by the audio input device 104 during the a particular operating state and/or flight phase. In this regard, each operating state and/or flight phase is associated with ambient and/or background noise proximate the audio input device 104 during operation of the aircraft 122, such that each acoustic noise model reflects the characteristics and/or patterns (e.g., volume or sound pressure level, frequencies, and the like) of the noise that would be sensed or otherwise received by the audio input device 104 during a respective operating state and/or flight phase. In an exemplary embodiment, the data storage element 120 maintains an acoustic noise model for each respective flight phase and/or operating state that may be encountered during operation of the aircraft 122. In some embodiments, the acoustic noise model may be obtained by recording the ambient noise within the cockpit of the aircraft 122 during operation of the aircraft 122 in a respective flight phase which is then stored by and/or otherwise utilized by the data storage element 120 and/or processing system 108 to construct the acoustic noise model. In this regard, the acoustic noise models may be dynamically updated during the lifetime of the aircraft 122 to reflect changes in characteristics of the cockpit noise, for example, in response to upgrading the engine or another component of the aircraft 122. It should be noted that although FIG. 1 depicts single data storage element 120, in practice, additional data storage elements may be present onboard the aircraft 122. For example, a first data storage element may maintain a plurality of available voice commands and a second data storage element may maintain a plurality of acoustic noise models.

Figure 2:
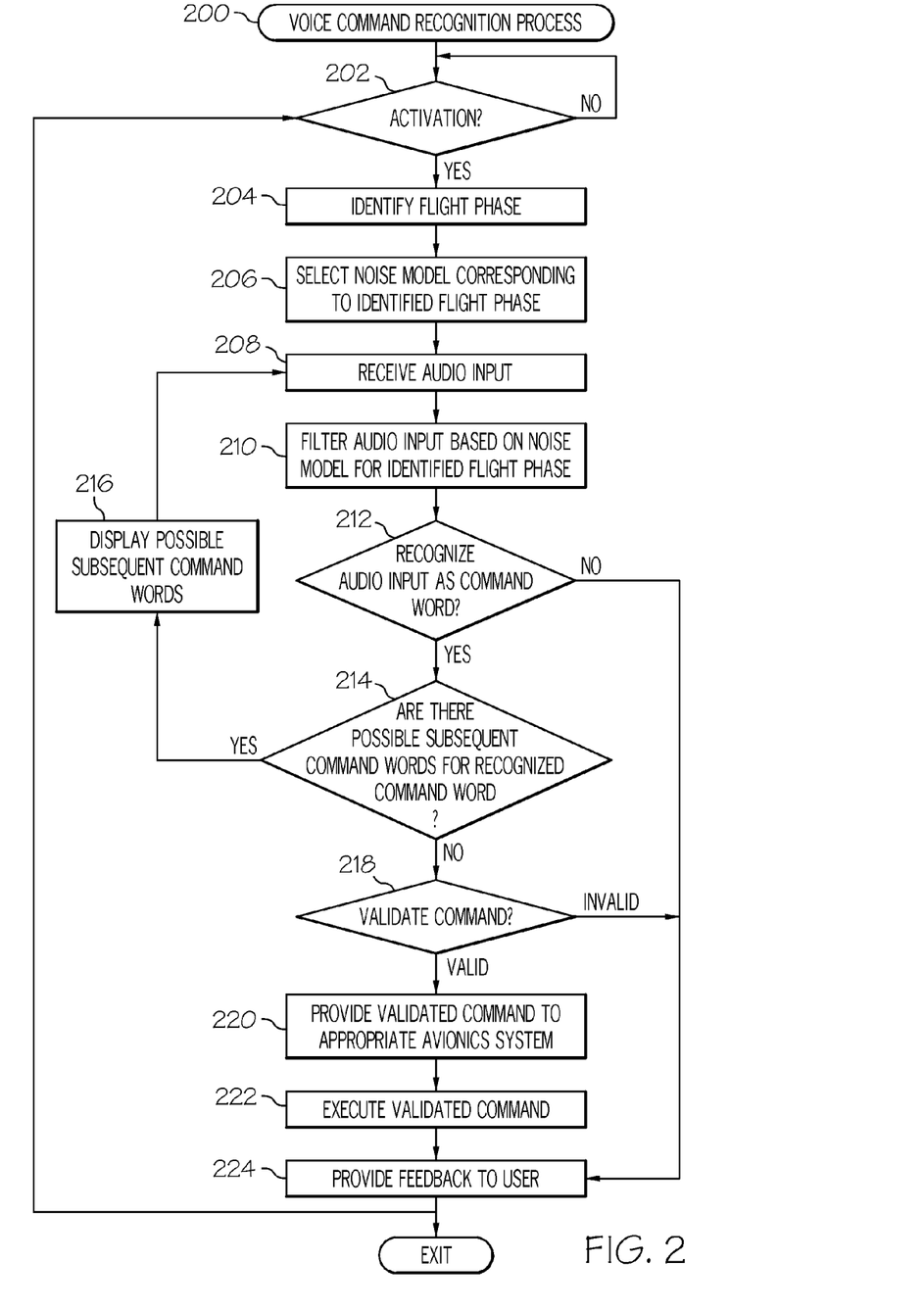
FIG. 2 is a flow diagram of an exemplary voice command recognition process suitable for use with the display system of FIG. 1 in accordance with one embodiment.

Referring now to FIG. 2, in an exemplary embodiment, a system 100 may be configured to perform a voice command recognition process 200 and additional tasks, functions, and operations described below. The various tasks may be performed by software, hardware, firmware, or any combination thereof. For illustrative purposes, the following description may refer to elements mentioned above in connection with FIG. 1. In practice, the tasks, functions, and operations may be performed by different elements of the described system, such as the display device 102, the audio input device 104, the audio output device 106, the processing system 108, the display system 110, an avionics system 112, 114, 116, 118 and/or the data storage element 120. It should be appreciated that any number of additional or alternative tasks may be included, and may be incorporated into a more comprehensive procedure or process having additional functionality not described in detail herein.

Referring again to FIG. 2, and with continued reference to FIG. 1, a voice command recognition process 200 may be performed to enable a user, such as a pilot, co-pilot or crew member, to quickly and easily interact with components, devices, and/or systems onboard an aircraft in a "hands free" and/or "head-up" manner. In an exemplary embodiment, the voice command recognition process 200 begins in response to an activation event (task 202). In this regard, an activation event corresponds to an input received by the processing system 108 indicative of a desire and/or need to enable or otherwise activate the voice command recognition process 200. In an exemplary embodiment, the processing system 108 monitors or polls the audio input device 104 for audio input that corresponds to an activation event. In this regard, the processing system 108 may be configured to initialize the voice command recognition process 200 in response to receiving an audio input that matches an activation voice command maintained by the data storage element 120. In accordance with one or more embodiments, the processing system 108 may be configured to initialize the voice command recognition process 200 automatically in response to receiving an audio input that corresponds to an emergency sound. This relieves a user (e.g., a pilot or co-pilot) of having to manually activate the voice command recognition process 200 during an emergency. In this regard, the processing system 108 may monitor one or more audio characteristics of the audio signal received from the audio input device 104, and initialize the voice command recognition process 200 in response to detecting an emergency sound based on audio characteristics of a received audio signal. For example, the processing system 108 may initialize the voice command recognition process 200 in response to detecting an audio signal from the audio input device 104 having time-frequency characteristics and/or amplitude-frequency characteristics that correspond to an emergency sound. In other embodiments, the processing system 108 also initializes the voice command recognition process 200 in response to an input signal received from an activation element (e.g., a button, switch, or knob) associated with the audio input device 104 or another physical feature within the cockpit of the aircraft 122. In yet other embodiments, the processing system 108 may be configured to continuously monitor or poll the audio input device 104 for audio input indicative of a desired voice command (e.g., task 208), in which case, the voice command recognition process 200 need not wait for an activation event.

Figure 3:
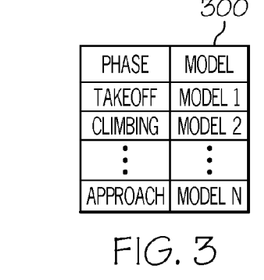
FIG. 3 is a table depicting an association between flight phases and acoustic noise models for an aircraft suitable for use in the system of FIG. 1 in accordance with one embodiment.

In an exemplary embodiment, in response to an activation event (e.g., an activation voice command, an emergency sound, or an activation element), the voice command recognition process 200 continues by identifying or otherwise determining the operating state (or flight phase) of the aircraft and selecting an acoustic noise model corresponding to the identified operating state (task 204, 206). In an exemplary embodiment, the processing system 108 obtains the current flight phase (or phase of flight) and/or operating state of the aircraft 122 from the flight management system 116. In alternative embodiments, the processing system 108 may determine the flight phase of the aircraft 122 based on information received from one or more avionics systems 112, 114, 116, 118 onboard the aircraft 122. For example, the processing system 108 may determine or otherwise identify the flight phase based on one or more of the following: the altitude (or above ground level) of the aircraft 122, the pitch and/or bank of the aircraft 122, the velocity of the aircraft 122, the geographic location of the aircraft 122 within the current flight plan for the aircraft 122, or a combination thereof. After identifying the flight phase and/or operating state of the aircraft 122, the processing system 108 selects the acoustic noise model from the data storage element 120 that corresponds to the identified flight phase and/or operating state. In this regard, the data storage element 120 may implement a table 300 that maintains an association between flight phases and acoustic noise models, as shown in FIG. 3.

In an exemplary embodiment, the voice command recognition process 200 continues by receiving or otherwise sensing an audio input indicative of a desired voice command from the audio input device (task 208). In this regard, the audio input device 104 receives or otherwise senses sound and converts the sound to a corresponding electrical signal. In an exemplary embodiment, the audio input device 104 generates an analog signal in response to receiving or otherwise sensing a sound and provides the analog signal to the processing system 108, which, in turn, converts the analog signal to a corresponding digital signal. In an exemplary embodiment, the voice command recognition process 200 continues by filtering the audio input in a manner that is influenced by the identified operating state by filtering the audio input based on the acoustic noise model corresponding to the identified operating state (task 210). In this regard, in an exemplary embodiment, the processing system 108 implements a digital filter based on the selected acoustic noise model for the identified flight phase and/or operating state. For example, the processing system 108 may identify particular frequencies of the acoustic noise model having relatively larger signal levels compared to surrounding frequencies (e.g., peak frequencies or pole frequencies) and implement a digital filter with zeros corresponding to the identified peak frequencies from the selected acoustic noise model. In this manner, the received audio input signal is filtered based on the current flight phase and/or operating state of the aircraft 122, resulting in a filtered audio input signal. In an exemplary embodiment, the characteristics (e.g., gain/attenuation, bandwidth, roll off, and the like) of the digital filter are chosen, such that the digital filter achieves a desired signal-to-noise ratio (SNR) for the bandwidth corresponding to human speech (e.g., 100 Hz-3 kHz). In other embodiments, the processing system 108 may be configured to process the received audio input using noise cancelling techniques in conjunction with the acoustic noise model for the identified flight phase to obtain the filtered audio input signal. By filtering the audio input based on the flight phase and/or operating state, the processing system 108 is capable of identifying or otherwise recognizing command words from the received audio input signal with increased accuracy and/or reliability, as described in greater detail below.

In an exemplary embodiment, the voice command recognition process 200 is configured to detect audio warnings from other avionics systems onboard the aircraft 122 and filter or otherwise ignore audio warnings to prevent unnecessarily utilizing speech recognition resources for audio input that does not correspond to a voice command proffered by a user. For example, an avionics system 118 may comprise a traffic alert and collision avoidance system or ground proximity warning system, wherein the avionics system 118 and the processing system 108 are cooperatively configured to provide auditory warnings to a user by generating synthesized audio output via audio output device 106. In some embodiments, the synthesized audio output from the avionics system 118 may have known time-frequency characteristics or have other audio characteristics indicative of synthesized audio output, wherein the processing system 108 is configured to determine that a received audio signal (or a portion thereof) did not originate from a user and ignore or otherwise nullify the received audio signal when the audio characteristics of the received audio signal match or otherwise correspond to synthesized audio output. In accordance with one or more embodiments, the processing system 108 is configured to identify or otherwise determine when the avionics system 118 is going to produce or otherwise generate a synthesized audio output. When the processing system 108 identifies and/or determines when the avionics system 118 is going to produce a synthesized audio output, the processing system 108 augments the filtering to account for the synthesized audio output. In this regard, in accordance with one embodiment, the processing system 108 combines or otherwise augments acoustic noise model for the identified flight phase with the synthesized audio output corresponding to the auditory warning to be generated by the avionics system 118, and generates a digital filter based on the augmented noise model in a similar manner as described above.

In an exemplary embodiment, the voice command recognition process 200 continues by performing one or more speech recognition techniques and/or algorithms to recognize, verify, or otherwise determine whether the received audio input signal corresponds to a voice command of a plurality of possible voice commands for the aircraft (task 212). As described above, in an exemplary embodiment, the plurality of possible voice commands comprises a predefined (or predetermined) limited set of voice commands intended to limit the vocabulary (or dictionary) used for speech recognition and/or matching, thereby increasing the accuracy and decreasing the response time of the speech recognition step. In an exemplary embodiment, the processing system 108 processes the filtered audio input signal and executes one or more speech recognition algorithms to identify or otherwise recognize the filtered audio input signal (or portions thereof) as corresponding to or otherwise matching one or more command words of a voice command of the plurality of possible voice commands. In this regard, in an exemplary embodiment, the processing system 108 determines a plurality of possible initial command words based on the plurality of possible voice commands maintained by data storage element 120. Each possible initial command word of the plurality of possible initial command words corresponds to an initial (or first) command word of respective voice commands of the plurality of possible voice commands, such that the plurality of possible initial command words consists of the complete set of initial (or first) command words for the plurality of possible voice commands. The processing system 108 then performs one or more speech recognition techniques and/or algorithms on a first portion of the filtered audio input signal (or a first filtered audio input signal) to recognize and/or match the first portion of the filtered audio input signal to one of the initial command words of the plurality of possible initial command words. When the first portion does not match or otherwise correspond to a possible initial command word of the plurality of possible initial command words, the voice command recognition process 200 provides feedback to the user indicating that the input word does not match or otherwise correspond to a possible command word (task 224), for example, the displaying a textual warning and/or message on the display device 102 or generating an auditory warning and/or message via audio output device 106.

In response to identifying or otherwise recognizing the first portion of the filtered audio input signal as a possible initial command word, the voice command recognition process 200 continues by determining whether a complete voice command has been received. In an exemplary embodiment, the voice command recognition process 200 determines whether a complete command has been received by determining or otherwise identifying whether there are any possible subsequent command words (or parameters) that may follow the recognized command word (task 214). In this regard, in an exemplary embodiment, the processing system 108 determining a second plurality of possible voice commands that comprises a subset of the plurality of possible voice commands maintained by data storage element 120, wherein the initial (or first) command word of each possible voice command of the second plurality of possible voice commands corresponds to the recognized initial command word for the desired voice command. After determining the second plurality of possible voice commands, the processing system 108 determines a plurality of possible second command words based on the second plurality of possible voice commands. In this regard, each possible second command word of the plurality of possible second command words corresponds to a second command word or a parameter following the initial command word for a respective voice command of the second plurality of possible voice commands, such that the plurality of possible second command words consists of the complete set of second command words and/or parameters for the second plurality of possible voice commands. In this regard, the processing system 108 and data storage element 120 are cooperatively configured to determine whether recognized initial command word may be followed by any other command words based on the plurality of possible voice commands. For example, if the first portion of the filtered audio input signal is recognized as the initial command word 'DISPLAY,' the processing system 108 may identify possible subsequent command words for 'DISPLAY' based on each command of the plurality of possible voice commands that starts with 'DISPLAY.' For example, in the tree structure example described above, the possible subsequent command words comprise the child nodes of (or have a child-parent relationship with) the recognized received command word. In an exemplary embodiment, in response to identifying possible subsequent command words, the voice command recognition process 200 continues by displaying the possible subsequent commands words on the display device (task 216). In this regard, the processing system 108 may identify possible subsequent command words for the recognized command word from the data storage element 120 and graphically display and/or render the possible subsequent command words on the display device 102 (e.g., as a list). Displaying the possible subsequent command words reduces the burden on a user that would be imposed by memorizing or otherwise attempting to guess the possible subsequent command words.

The voice command recognition process 200 then continues by receiving and filtering the audio input signal from the audio input device 104, and recognizing, verifying, or otherwise determining whether a subsequently received audio input signal corresponds to one of the possible subsequent command words (tasks 208, 210, 212). In this regard, after recognizing a first portion of the filtered audio input signal (or a first filtered audio input signal) as corresponding to a possible initial command word, the processing system 108 then performs one or more speech recognition techniques and/or algorithms on a second portion of the filtered audio input signal (or a second filtered audio input signal) to recognize and/or match the second portion of the filtered audio input signal to one of the possible second command words of the plurality of possible second command words based on the possible voice commands beginning with that possible initial command word, in a similar manner as described above. When the second portion of the filtered audio input signal (or the second filtered audio input signal) corresponds to one of the possible second command words, the voice command recognition process 200 determines or otherwise identifies whether there are any possible subsequent command words for the recognized second command word (task 214), and if there are possible subsequent command words for the recognized second command word, the voice command recognition process 200 displays the next possible subsequent command words and repeats the steps of receiving and filtering the audio input signal from the audio input device 104, and recognizing, verifying, or otherwise determining whether a subsequently received and filtered audio input signal (or a portion thereof) corresponds to one of the possible subsequent command words (tasks 208, 210, 212, 214, 216). The loop defined by tasks 208, 210, 212, 214 and 216 repeats until determining a complete voice command has been received when a recognized command word does not have any possible subsequent command words or parameters.

In response to determining a complete voice command has been received, the voice command recognition process 200 identifies the voice command corresponding to the recognized command words as the received voice command, and validates the received voice command based on the criteria and/or rules associated with the received voice command that would otherwise restrict operation and/or execution of the voice command (task 218). As described above, each voice command of the plurality of possible voice commands may be associated with a flight phase criterion which prescribes limits and/or restrictions on the flight phase(s) and/or operating states during which the voice command may be executed. In this regard, if the flight phase criterion associated with the received voice command does not allow execution of the received voice command during the identified flight phase and/or operating state (i.e., the current flight phase and/or operating state), the voice command recognition process 200 does not validate (or invalidates) the received voice command and provides feedback (e.g., a warning and/or message) to the user (task 224), as described above. In some embodiments, a received voice command may be associated with criteria and/or rules that limit the range of acceptable input values for parameters of the voice command, as described above. When the parameter of the received voice command is not within the range of acceptable input values for the respective voice command, the voice command recognition process 200 does not validate the received voice command and notifies the user (e.g., with a warning and/or message) (task 224). For example, a voice command for setting the communications frequency of a radio within communications system 112 (e.g., 'SET RADIO FREQUENCY [frequency parameter]') may be associated with criteria that impose a limit on the acceptable input values for the desired frequency (e.g., 118 MHz to 136.975 MHz), such that a received voice command to set the communications frequency of the radio would not be validated when the input value for the frequency is outside of the range of acceptable values (e.g., 'SET RADIO FREQUENCY 140 MHz').

In some embodiments, the received voice command may also be associated with a particular safety level (or safety criterion) that corresponds to the relationship between the respective voice command and its impact on the overall safety of aircraft operation. For example, the safety level may indicate the received voice command has little or no impact on safety, medium or moderate impact on safety, or a potentially significant impact. In this regard, a received voice command having a safety level that indicates the received voice command has a potentially significant impact on safety may require confirmation before validation. In this regard, the processing system 108 may provide feedback which indicates to the user the received voice command that was recognized by the processing system 108, for example by displaying the received voice command on the display device 102 or providing a synthesized speech echo repeating the received voice command via the audio output device 106, and then prompt the user for confirmation. The received voice command may then be validated (assuming doing so does not validate any flight phase criterion or other rules associated with the received voice command) in response to confirmation by the user (e.g., via audio input device 104 or another input device onboard the aircraft 122). Conversely, received voice commands having lower safety levels (e.g., commands with low to moderate impact on safety) may be validated (e.g., based on flight phase criterion or other rules) without requiring confirmation. In an exemplary embodiment, for received voice commands classified as having moderate impact on safety, the processing system 108 indicates to the user the received voice command that was recognized by the processing system 108, for example by displaying the received voice command on the display device 102 or providing a synthesized speech echo repeating the received voice command via the audio output device 106, but does not require confirmation for validation.

In response to validating the received voice command, the voice command recognition process 200 continues by executing the validated received voice command (task 222). In this regard, the processing system 108 is configured to provide the received voice command (or the appropriate portions or parameters thereof) to the avionics system 112, 114, 116, 118, 120 that is associated with the received voice command, wherein the avionics system 112, 114, 116, 118, 120 executes or otherwise performs the received voice command in response to the information received from the processing system 108. In an exemplary embodiment, after executing the received voice command, the voice command recognition process 200 provides feedback to the user which indicates a successful result and/or outcome of the command (task 224). For example, in response to a voice command to set a particular parameter of an avionics system (e.g., a radio frequency, altitude setting, and the like), the avionics system may provide feedback to the processing system 108 regarding the outcome and/or completion of the voice command, wherein the processing system 108 indicates to the user that the received voice command has been executed or otherwise performed. For example, the processing system 108 may indicate the command has been executed by providing a textual indication on the display device 102 that indicates the command was performed (e.g., "radio frequency set"). In an exemplary embodiment, in lieu of or in addition to a textual output, the processing system 108 generates a synthesized speech output that indicates the received voice command was performed and provides the synthesized speech output to the user via the audio output device 106. Depending on the embodiment, the voice command recognition process 200 may exit after executing the received voice command and/or providing feedback to the user, however, in other embodiments, the voice command recognition process 200 may repeat the tasks described above as desired throughout operation of the system 100. In some embodiments, the voice command recognition process 200 may remain activated until timing out, for example, when no validated voice commands are received within a predetermined amount of time.

One advantage of the systems and/or methods described above is that a user may quickly, reliably, and intuitively utilize an audio input device to interact with the other elements of a system onboard the aircraft. The received audio from the audio input device is filtered based on the flight phase and/or operating state of the aircraft, and a limited set of voice commands are implemented. By filtering the received audio input signal based on the flight phase and/or operating state of the aircraft as well as limiting the vocabulary used for speech recognition, the accuracy of the speech recognition is improved while at the same time reducing the response time. After recognizing a received audio input as a voice command of the limited set of voice commands, the received voice command is then validated based on one or more criteria associated with the received voice command, such as, for example, the allowed flight phases and/or operating states for the received voice command, the safety level or the received voice command, and/or the range of acceptable values for parameter(s) of the received voice command. The acoustic noise models for the flight phases and/or operating states of the aircraft may be dynamically updated to reflect changes in characteristics of the cockpit noise of an aircraft throughout the lifetime of the aircraft.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It being understood that various changes may be made in the function and arrangement of elements described in an exemplary embodiment without departing from the scope of the subject matter as set forth in the appended claims.

What is claimed is:

1. A method for utilizing audio commands onboard an aircraft, the method comprising:
   identifying a flight phase for the aircraft, resulting in an identified flight phase;
   receiving an audio input, resulting in received audio input;
   filtering the received audio input in a manner that is influenced by the identified flight phase for the aircraft, resulting in filtered audio input; and validating the filtered audio input as a first voice command of a first plurality of possible voice commands, wherein validating the filtered audio input comprises:
  determining a plurality of possible initial command words based on the first plurality of possible voice commands, each possible initial command word of the plurality of possible initial command words corresponding to an initial command word of a respective voice command of the first plurality of possible voice commands;
  recognizing a first portion of the filtered audio input as a first command word of the first voice command based on the plurality of possible initial command words;
  determining a plurality of possible second command words that may follow the first command word of the first voice command based on a subset of the first plurality of possible voice commands, wherein the first command word corresponds to an initial command word for each possible voice command of a subset of the first plurality of possible voice commands and each possible second command word of the plurality of possible second command words corresponds to a second command word of a respective voice command of the subset; and
  recognizing a second portion of the filtered audio input as a second command word of the first voice command based on the plurality of possible second command words.

2. The method of claim 1, wherein filtering the received audio input further comprises filtering the received audio input based on an acoustic model corresponding to the identified flight phase.

3. The method of claim 2, further comprising selecting, from a plurality of possible noise models, the acoustic noise model corresponding to the identified flight phase.

4. The method of claim 2, further comprising augmenting the acoustic noise model with synthesized audio corresponding to an auditory warning from an avionics system onboard the aircraft.

5. The method of claim 2, wherein:
  receiving the audio input comprises receiving the audio input using an audio input device onboard the aircraft; and
  the acoustic model corresponding to the identified flight phase is based on audible noise proximate the audio input device during the identified flight phase.

6. The method of claim 1, wherein validating the filtered audio input further comprises:
  validating the first voice command when the identified flight phase corresponds to an allowed flight phase of one or more allowed flight phases for the first voice command; and
  invalidating the first voice command if a flight phase criterion associated with the first voice command does not allow execution during the identified flight phase.

7. The method of claim 1, the first voice command being associated with a criterion corresponding to a range of acceptable values for a parameter of the first voice command, wherein validating the filtered audio input further comprises validating the first voice command when a portion of the filtered audio input corresponding to the parameter is within the range of acceptable values.

8. The method of claim 1, further comprising providing the first voice command to an avionics system onboard the aircraft in response to validating the filtered audio input as the first voice command, wherein the first voice command is executed by the avionics system.

9. The method of claim 1, further comprising arranging the first plurality of possible voice commands in a hierarchical manner, wherein each possible second command word of the plurality of possible second command words has a child-parent relationship with the first command word.

10. The method of claim 9, wherein arranging the first plurality of possible voice commands comprises maintaining the first plurality of possible voice commands in a tree data structure, wherein each possible second command word of the plurality of possible second command words is a child node of the first command word.

11. A method for utilizing audio commands onboard an aircraft, the method comprising:
  identifying a flight phase for the aircraft, resulting in an identified flight phase;
  receiving an audio input, resulting in received audio input;
  filtering the received audio input in a manner that is influenced by the identified flight phase for the aircraft, resulting in filtered audio input;
  automatically validating the filtered audio input as a first voice command of a first plurality of possible voice commands when a criterion associated with the first voice command corresponds to a first safety level; and
  validating the filtered audio input as the first voice command in response to a confirmation when the criterion associated with the first voice command corresponds to a second safety level.

12. A system for an aircraft comprising:
  an avionics system onboard the aircraft;
  an audio input device onboard the aircraft, the audio input device being capable of receiving audio input;
  a data storage element comprising a first plurality of possible voice commands; and
  a processing system coupled to the avionics system, the audio input device, and the data storage element, wherein the processing system is configured to:
    identify a flight phase for the aircraft, resulting in an identified flight phase;
    filter the audio input based on the identified flight phase, resulting in filtered audio input;
    recognize the filtered audio input as a first voice command of the first plurality of possible voice commands by:
      determining a plurality of possible initial command words based on the first plurality of possible voice commands;
      recognizing a first portion of the filtered audio input as a first command word of a first voice command of the first plurality of possible voice commands based on the plurality of possible initial command words;
      determining a plurality of possible second command words that may follow the first command word of the first voice command based on a subset of the first plurality of possible voice commands, wherein the first command word corresponds to an initial command word for each possible voice command of the subset; and
      recognizing a second portion of the filtered audio input as a second command word of the first voice command based on the plurality of possible second command words; and
    provide the first voice command to the avionics system in response to recognizing the filtered audio input as the first voice command, wherein the avionics system is configured to execute the first voice command.

13. The system of claim 12, wherein:
the data storage element comprises a plurality of noise models, each noise model being based on ambient auditory noise proximate the audio input device during a respective flight phase of the aircraft; and
the processing system is configured to:
  select a noise model from the plurality of noise models corresponding to the identified flight phase, resulting in a selected noise model; and
  filter the audio input based on the selected noise model.

14. The system of claim 13, further comprising a second avionics system configured to generate an auditory warning comprising synthesized audio output, wherein the processing system is configured to:
augment the selected noise model with the synthesized audio output, resulting in an augmented noise model; and
filter the audio input based on the augmented noise model.

15. The system of claim 12, wherein:
the first plurality of possible voice commands are maintained by the data storage element in a tree data structure; and
each possible second command word of the plurality of possible second command words has a child-parent relationship with the first command word.

* * * * *